United States Patent
Masse et al.

(10) Patent No.: US 10,086,253 B2
(45) Date of Patent: Oct. 2, 2018

(54) METHOD AND SYSTEM FOR MEASUREMENT OF THE SPEED OF A COMPETITOR ON A RACE COURSE

(71) Applicant: Swiss Timing Ltd, Corgémont (CH)

(72) Inventors: Fabien Masse, Lausanne (CH); Reto Galli, Munchenbuchsee (CH)

(73) Assignee: Swiss Timing Ltd, Corgémont (CH)

( * ) Notice: Subject to any disclaimer, the term of this patent is extended or adjusted under 35 U.S.C. 154(b) by 0 days.

(21) Appl. No.: 15/385,321

(22) Filed: Dec. 20, 2016

(65) Prior Publication Data

US 2017/0216704 A1 Aug. 3, 2017

(30) Foreign Application Priority Data

Jan. 29, 2016 (EP) .................................... 16153402

(51) Int. Cl.
*G06F 11/30* (2006.01)
*A63B 71/06* (2006.01)
*A63B 24/00* (2006.01)

(52) U.S. Cl.
CPC ...... *A63B 71/0616* (2013.01); *A63B 24/0062* (2013.01)

(58) Field of Classification Search
CPC ......... A63C 2203/18; G01P 3/42; G01P 3/50; G01S 15/60; G01S 13/60; G04F 8/08; G01C 22/002
See application file for complete search history.

(56) References Cited

U.S. PATENT DOCUMENTS

| 4,089,057 A * | 5/1978 | Eriksson ................ G01B 11/02 |
| | | 702/158 |
| 4,757,714 A * | 7/1988 | Purdy ..................... G01S 13/60 |
| | | 324/160 |
| 6,570,526 B1 | 5/2003 | Noller et al. |
| 2002/0116147 A1 | 8/2002 | Vock et al. |

(Continued)

FOREIGN PATENT DOCUMENTS

| DE | 195 18 638 A1 | 11/1996 |
| EP | 1 406 066 A2 | 4/2004 |
| WO | WO 01/00281 A2 | 1/2001 |

OTHER PUBLICATIONS

European Search Report with written opinion dated Jul. 14, 2016 in European application 16153402.9, filed on Jan. 29, 2016 (with English Translation of Categories of Cited Documents).

*Primary Examiner* — Lawrence Galka

(74) *Attorney, Agent, or Firm* — Oblon, McClelland, Maier & Neustadt, L.L.P.

(57) ABSTRACT

The method makes it possible to measure a speed of a competitor, such as a skier or snowboarder, on a ski or snowboard course, by means of a measurement system with a transponder module worn by the competitor. The method includes the step of activating the transponder module which includes a measurement unit with at least one measurement sensor, as soon as the race starts, a step of measuring the speed of the competitor via the measurement unit during the race along the course, and a step of transmitting the competitor's speed measurement to at least one base station of a decoder device of the measurement system for a timing device in order to display the speed of the competitor in real time or continuously on at least one screen.

18 Claims, 2 Drawing Sheets

(56) References Cited

U.S. PATENT DOCUMENTS

| | | | |
|---|---|---|---|
| 2003/0163287 A1* | 8/2003 | Vock | A43B 3/0005 |
| | | | 702/187 |
| 2004/0225467 A1* | 11/2004 | Vock | A63C 5/06 |
| | | | 702/142 |
| 2006/0031039 A1* | 2/2006 | Flentov | A61B 5/11 |
| | | | 702/141 |
| 2006/0136173 A1* | 6/2006 | Case, Jr. | A63B 24/00 |
| | | | 702/182 |
| 2010/0123777 A1* | 5/2010 | Stewart | G01S 13/92 |
| | | | 348/143 |
| 2012/0316036 A1* | 12/2012 | Zanetta | A63K 3/02 |
| | | | 482/8 |
| 2016/0279500 A1* | 9/2016 | Zanetta | A63B 71/06 |
| 2017/0065864 A1* | 3/2017 | Galli | G07C 1/22 |
| 2017/0065871 A1* | 3/2017 | Galli | A63B 69/0053 |

* cited by examiner

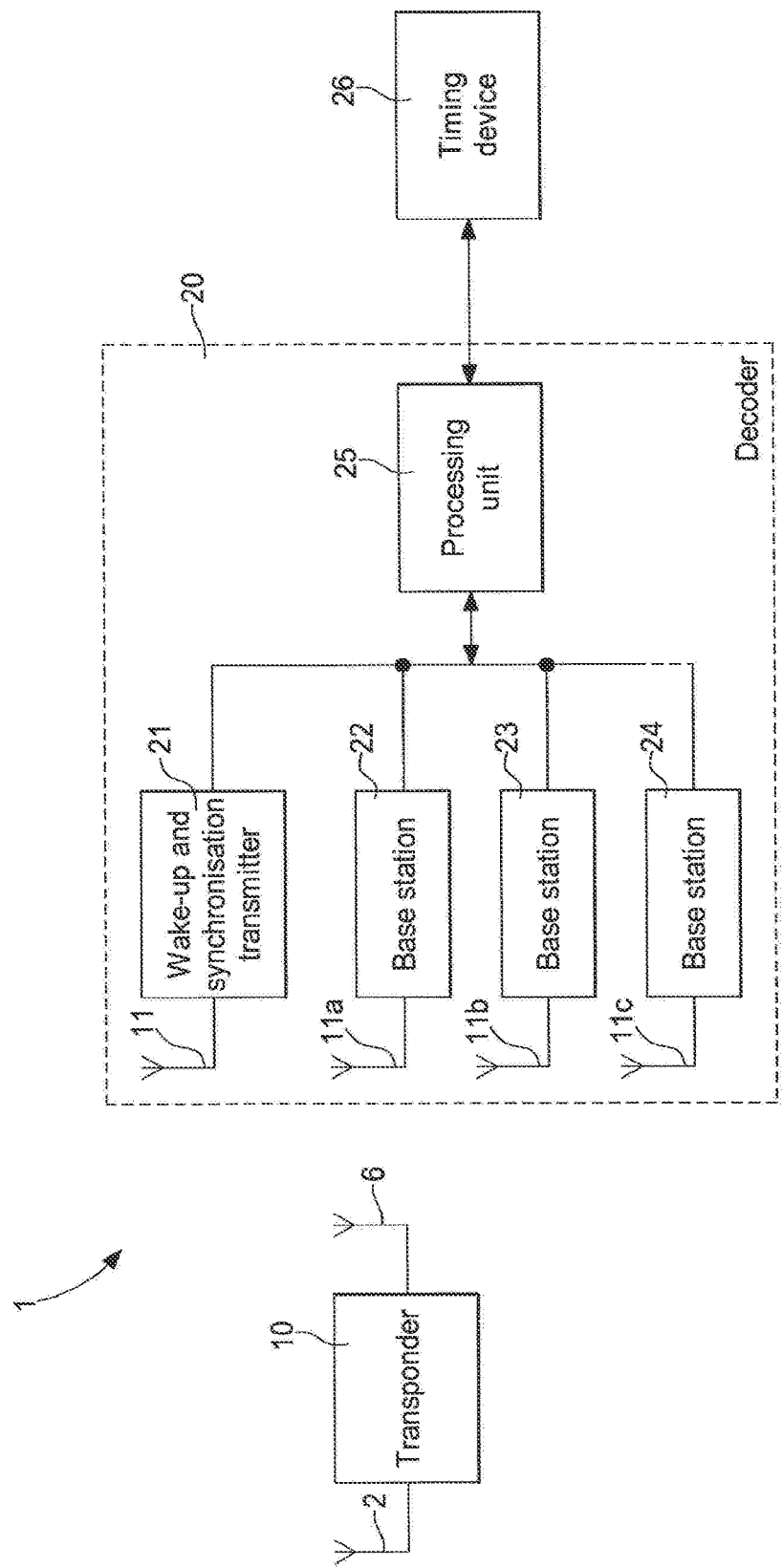

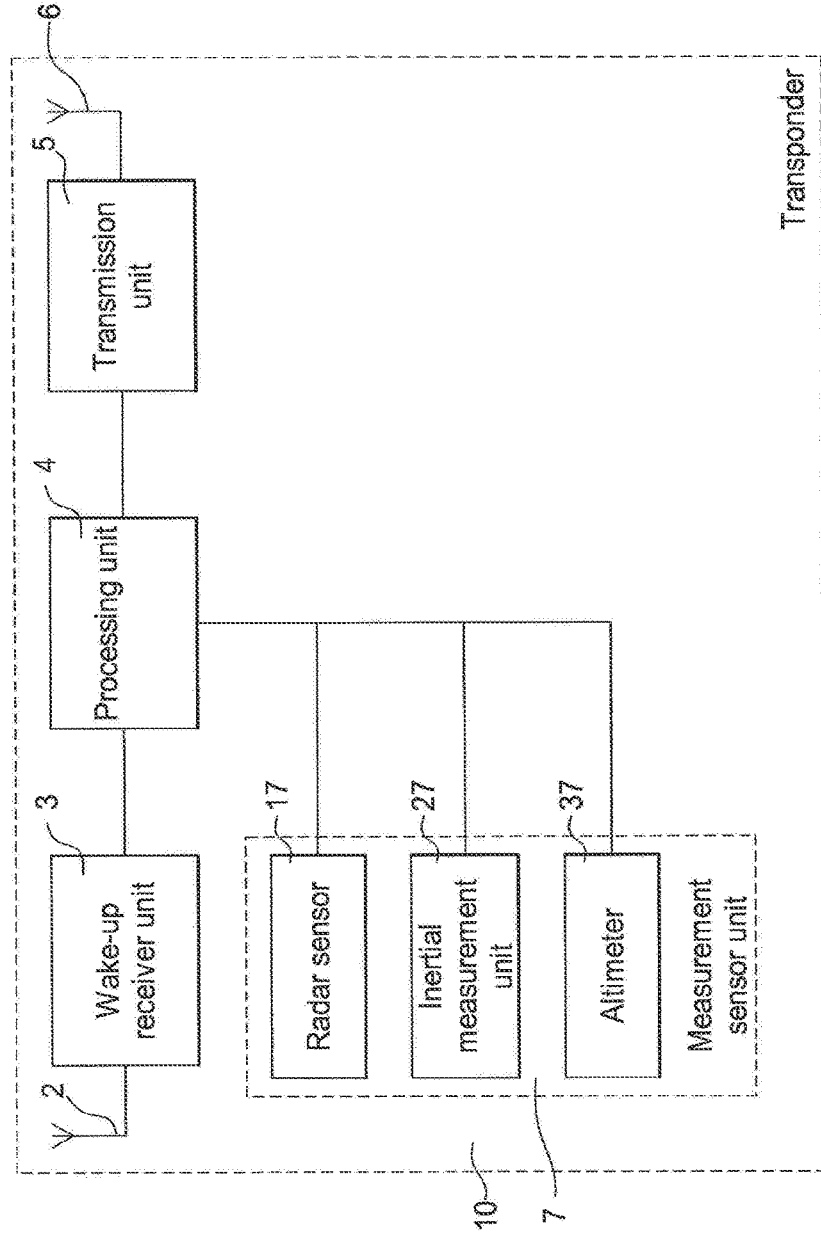

METHOD AND SYSTEM FOR MEASUREMENT OF THE SPEED OF A COMPETITOR ON A RACE COURSE

This application claims priority from European Patent Application No 16153402.9 of Jan. 29, 2016, the entire disclosure of which is hereby incorporated herein by reference.

FIELD OF THE INVENTION

The invention concerns a method for the measurement and display of at least the speed of a competitor, for example of a skier or a snowboarder, on a race course, for example a ski or snowboard course.

The invention also concerns a system for continuous measurement of at least the speed of a competitor for implementation of the method.

BACKGROUND OF THE INVENTION

In a competition, such as a downhill ski race, the speed of a competitor, such as a skier, can be measured nowadays by using, for example two photoelectric cells, which are placed a few meters away from each other. Such a speed measurement can also be made by means of a Doppler radar system, which uses a radar gun, such as those indicated on the website http://www.stalkerradar.com/sportsradar/. Several radar guns can be placed in proximity to the downhill course at various key points on said course.

Devices for measuring speed in a ski race, which may be stationary, are not capable of supplying speed continuously, but only at certain points on the race course. Moreover, no portable device includes means capable of transmitting the results in real time to a base station in order to display the speed live on a screen or on the television.

Conventional portable radar or ultrasonic devices also have the drawback that they can lose contact with a linked stationary speed measuring means during a downhill ski race. This means that even a wide-angle Doppler radar can lose sight of the ground during jumps in the race. This disrupts the real-time speed measurement.

US Patent Application 2002/0116147 A1 describes a portable device provided with a sensor unit connected to a controller. The sensors may be a speed sensor, such as a Doppler effect sensor, a power sensor, and a drop distance sensor, such as a pressure sensor or altimeter. An RF communication unit may be provided for communicating measurement data to a base station. Measurements from the sensors can be stored in the portable device and processed in said device prior to transmission.

However, such a portable device does not describe an activation and synchronisation operation at the start of the race, and an operation of calibrating the pressure sensor. It is not possible to accurately determine the speed, flight time and flight distance with a combination of the measurements made by the sensors, or to continuously transmit the speed measurement to a base station for display on a display screen, which are drawbacks.

EP Patent Application 1 406 066 A2 describes a device for determining distance in a race by measuring gradients and pressure differences. The pressure difference is measured by a pressure sensor, while the gradients are measured by an acceleration sensor, which takes account of static and dynamic acceleration.

The device also does not describe activation and synchronisation, or calibration of the sensors at the start of a race. No clear combination of the measurements made by the sensors is described for continuously accurately determining speed during the downhill ski race for transmission to a base station for display on a screen, which is a drawback.

US Patent Application 2002/0059044 A1 describes a portable device mainly for measuring a ski speed. To achieve this, a speed sensor and a sensor for determining jump or flight times are used. A microprocessor allows the information from the jump sensor to be converted to determine the flight time. A display device may be provided to show this time to the skier, but it is not possible to send information in real time.

Such a device does not describe activation and synchronisation, or calibration of the sensors at the start of the race. Further, no combination of the measurements from the sensors is described for continuously accurately determining the skier's speed for transmission to a base station for display on a screen, which is a drawback.

Other portable devices are known for measuring the speed of a skier. In particular, U.S. Pat. No. 4,546,650 can be cited, which describes a speed measuring device which includes at least one wheel in contact with the course and means for determining the rotational speed of the wheel. However, this type of device does not allow a precise and continuous speed measurement to be made.

EP Patent 1 084 422 B1 describes the use of at least one ultrasonic or micro-wave Doppler sensor, which is disposed on the ski, on the ski boot or on the belt of the skier. The Doppler sensor has a wide angle of aperture, which can vary to permit measurement with a precision of ±1%, but it does not allow a precise continuous speed measurement to be made from when the skier starts and during a jump on the course.

It is also to be noted that it is possible to envisage making a continuous speed measurement by using a GPS receiver. Depending on interference due to multiple signal paths, to the sky being blocked by mountains or other objects and to geometric dilution of precision, a precision of 95% can nonetheless be achieved. On a mountain slope with an inclination of 45°, horizontal speed is 30% lower than three-dimensional speed. In order to work accurately on a racing skier, the GPS receiver must be placed on the skier's helmet, but this represents an unacceptable safety risk during a downhill race. Further, as the sensor is not attached to the ski, there is a lack of precision due to movements between the head and the ski. Although GPS technology normally permits speed measurement in three directions, the user of the GPS device only receives two-dimensional speed horizontally. This may result in a big difference for the skier compared to his actual speed, which is a drawback.

SUMMARY OF THE INVENTION

It is thus an object of the invention to overcome the drawbacks of the aforementioned prior art by proposing a method for measurement of at least the speed of a competitor, for example of a skier or of a snowboarder, on a race course, for example a ski or snowboard course, wherein it is possible to make a precise continuous speed measurement during the race to transmit to at least one base station.

To this end, the invention concerns a method for measurement of at least one speed of a competitor, such as a skier or a snowboarder, on a race course, such as a ski or snowboard course, by means of a measurement system with a transponder module worn by the competitor, the method including the steps of:

activating the transponder module, which includes a measurement unit with at least one measurement sensor, at the start of the race, measuring the speed of the competitor by means of the measurement unit during the race along the course, and transmitting the competitor's speed measurement to at least one base station of the measurement system in real time in order to display the competitor's speed in real time or continuously on at least one screen.

One advantage of the speed measurement method lies in the fact that the speed, particularly of a skier, can be viewed on a remote display screen, such as a television set, throughout the race and not only at determined points on the race course. The transponder module therefore includes a measurement unit having at least one speed sensor, such as a Doppler radar speed sensor for measuring speed in real time or continuously during the race. This speed measurement can be made from the start and until the finish of the race. To achieve this, the transponder module is activated and synchronised at the start by a synchronising transmission from a transmitter of a precise time base or timing decoder device or by a sensor in situ.

One advantage of the method for measuring the speed of a competitor lies in the fact that account is also taken of a measurement made by at least one motion sensor of the transponder module, such as a 9-axis inertial motion sensor having a 3-axis accelerometer, a 3-axis gyroscope and a 3-axis magnetic sensor. The motion sensor measurement allows the speed of the competitor to be determined, especially during jumps on the race course. The measurement from the Doppler radar sensor and from the motion sensor can be merged in the transponder module to precisely determine a speed measurement to be communicated in real time or continuously. It is also possible to use a measurement from a pressure sensor of the transponder module, which is calibrated at the start of the race, to provide height data and to determine a vertical speed especially in jumps during the race.

Advantageously, it is also possible to measure the length of jumps made by the competitor during the ski or snowboard descent via sensors of the measurement unit of the transponder module. Further, it may also be possible to match the speed measurements to exact positions on the race course by using the barometric pressure from the pressure sensor. A comparison of the speed curves of several competitors, such as skiers or snowboarders, can also be made after the race.

Advantageously, intermediate time measurements can be made via the transponder module, which includes the Doppler radar speed sensor, the motion sensor and the pressure sensor, following synchronisation of the transponder module pressure sensor at the start of the race. These intermediate time measurements can primarily be determined by a measurement from the altimeter calibrated at the start of the race.

To this end, the invention also concerns a system for measuring at least one speed of a competitor during a race for implementation of the measurement method, the measurement system including at least one personalised transponder module worn by the competitor, which includes a measurement unit for measuring a speed, a decoder device, and a timing device connected to the decoder device for timing the race of each competitor, the decoder device including a transmitter for transmission of an activation signal for the transponder module at the start of a race, and at least one base station for receiving a continuous speed measurement data signal from the transponder module during the race, wherein the transponder module is configured to be activated as soon as the race starts in order to provide a continuous speed measurement at any point on a race course.

BRIEF DESCRIPTION OF THE DRAWINGS

The objects, advantages and features of the method and system for measurement of at least the speed of a competitor during a race according to the invention will appear more clearly in the following description of at least one non-limiting embodiment illustrated by the drawing, in which:

FIG. 1 schematically represents according to the invention a system for measuring at least the real time or continuous speed of a competitor during a race for implementation of the measurement method according to the invention, and FIG. 2 schematically represents the components of the transponder module, which is carried by the competitor for measuring at least one speed during the race according to the invention.

DETAILED DESCRIPTION OF THE INVENTION

In the following description, all those elements of the system for measuring at least the speed of a competitor, such as a skier or snowboarder during a ski or snowboard race for implementation of the measurement method, which are well known to those skilled in the art in this technical field, will be described only in a simplified manner.

FIG. 1 schematically represents the main elements, which form a system 1 for measuring the speed of a competitor in a race, such as a ski or snowboard race. Measurement system 1 is arranged to make a real-time measurement, i.e. live, or continuously, of the speed of a competitor from the start of the race and until the finish while allowing the live display of said speed on a screen or via broadcast on a television set to spectators. The various steps of the speed measurement method will be described in detail below after the description of the various components of measurement system 1.

Measurement system 1 includes one or more transponder modules 10, which are each intended to be worn by a competitor while being personalised to said competitor, who wears it for measuring, in particular, said speed during the race. An identification code is attributed inside transponder module 10 to each competitor wearing the same. Each transponder module 10 for the competition is disposed, for example, on one of the competitor's boots. The measurement system also includes a decoder device 20 connected to a timing device 26, which may include at least one screen, not represented, for the display of measurement data in the race.

This decoder device 20 first includes a transmitter 21 for the transmission, via an antenna 11, of at least one wake-up or activation signal to at least one transponder module 10 worn by a competitor. Transmitter 21 can also transmit a wake-up and synchronisation signal to transponder module 10 to synchronise a time base of the transponder module. The transmission of the activation and synchronisation signal may be long range, for example from the finish area of the race, or also short range in the start area. Transponder module 10 receives the wake-up and synchronisation signal via a first antenna 2 at the start of the race.

It is to be noted that activation of transponder module 10 may also be achieved via in situ sensors. i.e. at the place of the start of the race or disposed directly on the ski.

Decoder device 20 also includes one or more base stations 22, 23, 24, which can each receive a measurement signal, particularly a competitor's speed measurement signal, transmitted by a second antenna 6 of the transponder module 10 in the race. Each base station 22, 23, 24 can receive separately or together via a receiving antenna 11*a*, 11*b*, 11*c*, the real-time or continuous speed measurement signal from transponder module 10. Decoder device 20 further includes a processing unit 25 connected to transmitter 21 and to the various base stations 22, 23, 24, to process the commands or measurement data for transmission to timing device 26.

It is to be noted that each base station 22, 23, 24 of decoder device 20 can be placed at a specific location on the race course. For example, in a ski or snowboard race, base stations 22, 23, 24 could be spaced apart from each other by 200 to 400 m between the start and finish of the race. The various base stations 22, 23, 24 may be connected by cable or also by wireless communication so as to transmit data or commands to processing unit 25 by cable or also by wireless transmission.

FIG. 2 represents transponder module 10 with the main components comprised therein. Transponder module 10 includes a wireless signal receiver unit 3 for receiving, via a first antenna 2, at least one signal from a transmitter of the decoder device. The signal provided by the transmitter is generally a wake-up or activation signal from the transponder module, which is preferably of the active type. This wake-up signal is mainly received at the moment the race starts. Transponder module 10 may also receive a wake-up/activation and synchronisation signal for synchronising a time base of the transponder as soon as the race starts.

Transponder module 10 also includes a measurement unit 7 with at least one measurement sensor particularly for measuring the speed of a competitor during the race. Preferably, measurement unit 7 includes at least one Doppler radar speed sensor 17. Measurement unit 7 may also include an inertial measurement unit 27, which is a motion sensor consisting of a 3-axis accelerometer, a 3-axis gyroscope and a 3-axis magnetometer. Measurement sensor unit 7 may also include a barometric pressure sensor, such as an altimeter 37, which can be calibrated by the wake-up and synchronisation signal received from the decoder device transmitter at the moment that the competitor starts the race. Generally, the altimeter calibration must be carried out at the location of the start of the race just before the start of said race or at the moment that the race starts.

Transponder module 10 also includes a processing unit 4, which receives the activation and synchronisation signal from receiver unit 3, and the measurements made by measurement unit 7 with at least one sensor, once activated. This processing unit 4 may include a processor or microprocessor and an oscillator for clocking the processing operations, and for acting as a time base once calibrated by the activation and synchronisation signal. Processing unit 4 is connected to a transmission unit 5 for the transmission of data measurement signal for at least the speed of the competitor by a second antenna 6. A memory (not represented) may also be provided inside transponder module 10 for successively storing various speed measurements over time and calibration or time data, and for storing an identification code specific to the competitor.

It is to be noted that the first and second antennas 2, 6 of transponder module 10 may be a single antenna for reception of a control, wake-up and synchronisation signal and transmission of a measurement data signal. For of data signal transmission, the signal carrier frequency may be comprised between 300 MHz and 3,000 MHz, and especially, for example, at 433 MHz, 868 MHz or 915 MHz. Data modulation is achieved by amplitude modulation or frequency or phase modulation. It may be chosen from several carrier frequencies for transmission of the data signal to the decoder device. Thus, various transmission channels may be selected.

With reference to FIGS. 1 and 2, the method for measuring at least the speed of a competitor, who is a skier or a snowboarder, in real time, i.e. live or continuously during a ski or snowboard race, is now described. The method includes a first step of activating transponder module 10, which includes a measurement unit 7 with at least one measurement sensor, as soon as the race starts. Next, the method includes a second step, which consists in continuously measuring the speed of the competitor by means of the measurement unit along the course and during said race. In a third step of the method, the speed measurement is transmitted to at least one base station 22, 23, 24 of measurement system 1, in real time or continuously. Finally, the competitor's speed measurement is displayed on at least one screen or rebroadcast on a television set for spectators. The competitor's speed can thus be measured at any point on the race course, live, and be viewed on a screen.

Each base station 22, 23, 24 or at least one base station can receive a real-time or continuous speed measurement data signal from the transponder module 10 worn by the competitor during his race. Transmission can be made to a processing unit 25 of a decoder device. Transmission may also be provided from processing unit 25 of the decoder device to timing device 6, which controls the race timing of each competitor. From timing device 26, there is a real-time or continuous speed display on at least one screen for spectators.

Transponder module 10 may include a measurement unit 7, which, in addition to Doppler radar sensor 17, includes a motion sensor, which is an inertial measurement unit 27. An altimeter 37 may also be provided to form with radar sensor 17 and motion sensor 27, a unit with three measurement sensors. The speed measurement by the Doppler radar sensor is primarily made and transmitted to processing unit 4 for transmission to at least one base station 22, 23, 24. The measurement by radar sensor 17 could be momentarily interrupted for a short period, for example for a duration on the order of 2 ms during transmission of the measurement data signal by transmission unit 5 of transponder module 10. This makes it possible to avoid interference during the speed measurement and data signal transmission.

Upon activation of transponder module 10 at the start of the race, synchronisation of the transponder module may also occur, to enable it also to determine a race time via an integrated time base. Activation of the transponder module is achieved either by using short range magnetic communication or long range radio frequency communication using dedicated equipment located close to the start area.

During operation of transponder module 10 after the start of the race, the transponder module detects the moment when radar sensor 17 loses sight of the ground, for example during a jump on a bump on the course. Thus, when the absence of Doppler-shifted frequency components is detected, the current speed is estimated based on measurement data, for example acceleration, from motion sensor 27. The measurement from the Doppler radar sensor and from the motion sensor can be merged in the transponder module to precisely determine a speed measurement to be communicated in real time or continuously. To further increase the accuracy of this speed estimation, a vertical speed is taken into account in the measurement of the pressure sensor, which is altimeter 37, which is calibrated at the start of the race.

It is to be noted that jumps can also be detected by specific features relating to the accelerometer of motion sensor 27. These specific features are, for example, the absence of vibrations or absence of gravity components. The jump length in meters can also be calculated and transmitted to at least one base station 22, 23, 24. To achieve this, there is used an estimated orientation from motion sensor 27 and/or a speed estimation from radar and/or motion sensors 27, and/or a vertical speed from barometric pressure sensor 37 during the jump. The take-off time and landing or contact time with the slope is also taken into account.

With a precise altitude profile for the race course, the continuous speed measurements can be adjusted or adapted or matched based on the measurement from barometric pressure sensor 37, which is used as an altimeter, at an exact location on the race course. Using synchronised time indices of the measurement in transponder module 10 and after calibration of pressure sensor 37, allows for even more accurate position adjustment. This position adjustment is more accurate at the points where intermediate times are generally taken by photocells. Such position matching also allows the speed curves of different skiers to be compared after the race. Further, using the barometric pressure sensor measurement with the synchronised time base, makes it possible to determine intermediate times during the competitor's race at any virtual line, which is perpendicular to the slope of the mountain.

From the description that has just been given, several variants of the system and method for measuring at least the speed of a competitor in a race can be devised by those skilled in the art without departing from the scope of the invention defined by the claims. The transponder module may include several other sensors, such as a temperature sensor. It is also to be noted that the measurement system could also have been used to measure the speed of a competitor for example in another race, such as a cycling race or another sport, or even to measure speed in a ski jump.

What is claimed is:

1. A method for measurement of at least one speed of a competitor, such as a skier or a snowboarder, on a race course, such as a ski or snowboard course, by a measurement system with a transponder module worn by the competitor, the method comprising:
   activating the transponder module, which includes a measurement unit with at least one measurement sensor, at a start of a race,
   measuring the speed of the competitor by the measurement unit during the race along the course, and
   transmitting the competitor's speed measurement to at least one base station of the measurement system in real time in order to display the competitor's speed in real time or continuously on at least one screen,
   wherein the transponder module is activated and synchronized as soon as the race starts by a wake-up and synchronisation signal from a transmitter of a decoder device of the measurement system.

2. The measurement method according to claim 1, wherein the measurement of a current speed of the competitor during the race is achieved by a Doppler radar sensor of the measurement unit and transmitted to a processing unit of the transponder module, in order to transmit a speed measurement data signal via a transmission unit of the transponder module to the at least one base station of the measurement system in real time.

3. The measurement method according to claim 2, wherein momentary interruptions in the speed measurement by the radar sensor are effected during the transmission of the measurement data signal by the transmission unit.

4. The measurement method according to claim 2, wherein the current speed of the competitor is estimated during the race based on measurement data from a motion sensor of the measurement unit of the transponder module, following detection of an absence of Doppler-shifted frequency components from the radar sensor.

5. The measurement method according to claim 4, wherein the motion sensor is an inertial measurement unit, which includes a 3-axis accelerometer, a 3-axis gyroscope and a 3-axis magnetic sensor, wherein the current speed is estimated by the motion sensor.

6. The measurement method according to claim 5, wherein a measurement of the inertial measurement unit also determines a take-off time and a landing time or contact time with a slope when jumps are made during the race.

7. The measurement method according to claim 2, wherein a speed is estimated by a pressure sensor of the measurement unit of the transponder module in cooperation with the measurement made by the radar sensor during loss of sight of the ground by the radar sensor.

8. The measurement method according to claim 7, wherein the pressure sensor, which is an altimeter, is calibrated just before the start of the race or at the moment that the race starts.

9. The measurement method according to claim 8, wherein, with the measurement made by the altimeter with synchronisation of a time base of the transponder module, intermediate times are determined during the competitor's race.

10. The measurement method according to claim 8, wherein speed measurements are matched to exact positions on the race course based on barometric pressure measurements from the calibrated altimeter.

11. The measurement method according to claim 8, wherein the transponder module includes inside a processing unit a processor and an oscillator for clocking operations of the transponder module and acting as a time base, which is synchronised at the start of the race, wherein that synchronised time indices of the measurement in the transponder module are used with the measurement from the calibrated altimeter for precisely determining positions on the race course.

12. The measurement method according to claim 11, wherein, after transmission of the measurement data signal to the at least one base station of the decoder device of the measurement system, a comparison is made of speed curves of several competitors at the end of the race in cooperation with a timing device connected to the decoder device.

13. The system for measuring at least one speed of a competitor during a race, the measurement system comprising:
   at least one personalised transponder module worn by the competitor, which includes a measurement unit for measuring a speed, a decoder device, and a timing device connected to the decoder device for timing the race of each competitor, the decoder device including a transmitter for transmission of an activation signal for the transponder module at a start of the race, and
   at least one base station for receiving a continuous speed measurement data signal from the transponder module during the race, wherein the transponder module is configured to be activated as soon as the race starts in order to provide a continuous speed measurement at any point on a race course.

14. The measurement system according to claim 13, wherein the measurement unit of the transponder module includes at least one Doppler radar sensor for the speed measurement.

15. The measurement system according to claim 14, wherein the measurement unit of the transponder module further includes a motion sensor, which is an inertial measurement unit for estimating a speed of the competitor if the radar sensor does not provide an adjusted speed when there is a jump during the race.

16. The measurement system according to claim 13, wherein the transponder module includes a receiver unit for receiving a wake-up and synchronisation signal from the transmitter of the decoder device, a processing unit connected to the receiver unit and to the measurement unit and a unit for transmission of a speed measurement data signal from the processing unit.

17. The measurement system according to claim 14, wherein the measurement unit of the transponder module further includes a pressure sensor, which is an altimeter intended to be calibrated at the moment the race starts, to determine a speed in cooperation with the measurement made by the radar sensor.

18. The measurement system according to claim 17, wherein the calibrated altimeter is configured to determine intermediate times during the race with the transponder module provided with a synchronised time base.

* * * * *